United States Patent [19]
Lee

[11] Patent Number: 5,206,497
[45] Date of Patent: Apr. 27, 1993

[54] FREE-SPACE OPTICAL SWITCHING APPARATUS

[75] Inventor: Byung H. Lee, Holmdel, N.J.

[73] Assignee: AT&T Bell Laboratories, Murray Hill, N.J.

[21] Appl. No.: 863,660

[22] Filed: Apr. 6, 1992

[51] Int. Cl.$^5$ .............. G01J 1/20; G02B 27/00; G02B 6/00

[52] U.S. Cl. .............. 250/201.1; 250/227.24; 250/551; 385/47; 219/121.81; 359/117

[58] Field of Search .............. 385/47; 250/227.24, 250/201.1, 551, 234–235, 213 A, 227.11, 208.2–208.6, 230; 359/629, 117, 173, 159; 219/121.78–121.81, 121.83

[56] References Cited

U.S. PATENT DOCUMENTS

| | | | |
|---|---|---|---|
| 4,329,017 | 5/1982 | Kapany et al. | 385/47 |
| 4,348,939 | 9/1982 | Hipp | 250/230 |
| 4,580,292 | 4/1986 | Laor | 455/607 |
| 4,696,062 | 9/1987 | La Budde | 359/173 |
| 4,714,830 | 12/1987 | Usui | 250/234 |
| 4,801,791 | 1/1989 | Cain | 250/201.1 |
| 4,843,209 | 6/1989 | Milligan | 219/121.78 |
| 4,847,479 | 7/1989 | Clark et al. | 250/201.1 |
| 4,893,891 | 1/1990 | Fujita et al. | 350/96 |
| 4,927,226 | 5/1990 | Ortiz, Jr. | 359/159 |
| 4,945,489 | 7/1990 | Vahab | 219/121.78 |
| 5,000,534 | 3/1991 | Watanabe et al. | 350/96.20 |
| 5,045,678 | 9/1991 | Esser et al. | 250/227.24 |

FOREIGN PATENT DOCUMENTS

| | | | |
|---|---|---|---|
| 0210390 | 10/1985 | Japan | 219/121.81 |
| 0063919 | 3/1989 | Japan | 250/201.1 |

OTHER PUBLICATIONS

Klauser, "Laser Micromachine", IBM Tech. Dis. Bull. vol. 21, No. 11, Apr. 1979, pp. 4431–4432.

H. Scott Hinton, "Switching to photonics", IEEE Spectrum, Feb. 1992, pp. 42–45.

Primary Examiner—David C. Nelms
Assistant Examiner—Michael Messinger
Attorney, Agent, or Firm—R. P. Marley

[57] ABSTRACT

An optical switching apparatus wherein one or more information-bearing collimated laser beams are each launched into free-space and directed onto a selected photo-receptor to effect an optical cross-connection. Each launched beam is split into two separate components: a payload component, and a monitor component. The payload component of the beam is directed toward a photo-receptor, and the monitor component is directed toward a photo-sensor. The direction in which a particular information-bearing beam is launched is controlled in response to feedback received from the photo-sensor as a function of the position the monitor component associated with that information-bearing beam.

21 Claims, 4 Drawing Sheets

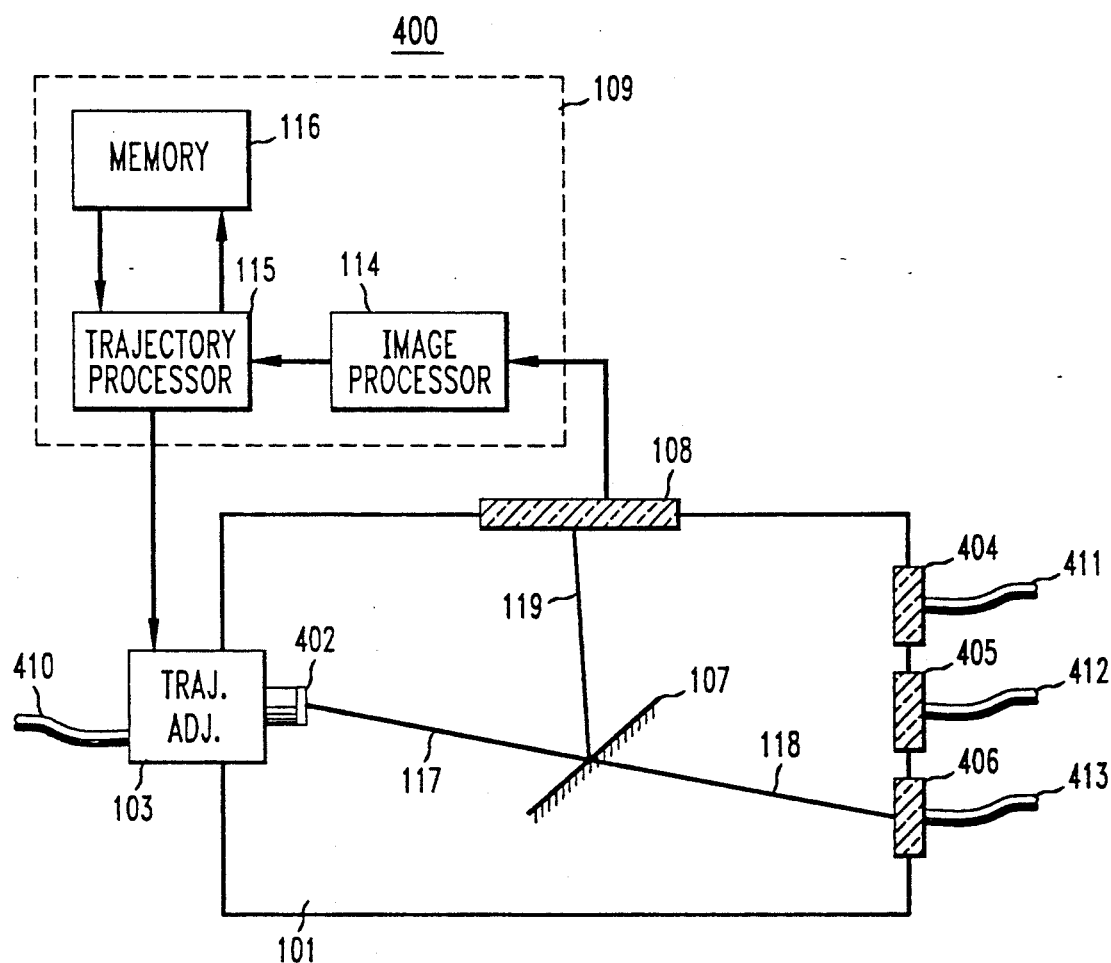

FREE-SPACE OPTICAL SWITCHING APPARATUS

TECHNICAL FIELD

The invention relates to optical switching apparatus and, more particularly, to a free-space optical cross-connect switching apparatus.

BACKGROUND OF THE INVENTION

One method of switching an optical signal from one path to another is by means of an optical cross-connect switch. In particular, free-space optical cross-connect switches perform this switching by re-directing an information-bearing collimated laser beam from one route to another as the light traverses a free-space path. This re-direction is accomplished by varying the trajectory on which the collimated laser beam is launched into the free-space path, so that it exits on a different route from the opposite end of the free-space path.

Prior free-space optical cross-connect switches employ schemes for varying the launch trajectory of a collimated laser beam that require the use of a companion pilot beam for each information-bearing beam being launched. Each of these pilot beams is aligned with a specific information-bearing beam and employed to guide that beam onto a photo-receptor which serves as a gateway to the desired exit route. Typically, each photo-receptor is situated at the center of an array of photo-detectors. In operation, a particular information-bearing beam, along with its companion pilot beam, is launched toward a particular photo-receptor. The surrounding photo-detectors sense the pilot beam, and provide feedback to a controller which directs the information-bearing beam directly onto the proper photo-receptor.

While this type of free-space optical cross-connect switch has proved effective, it requires a significant amount of hardware to implement the pilot beam system. In addition, as the pilot beam provides the sole means for insuring proper targeting of the information-bearing beam, misalignment between the pilot and information-bearing beams could result in a failed cross-connection. Another drawback of this type of optical cross-connect switch is the limited ability of the photo-detectors to locate the pilot beam. If a pilot beam is not incident upon one of the photo-detectors, the cross-connect switch is left "blind" as to the location of the pilot beam. This deprives the controller of any feedback to aid in properly targeting the information-bearing beam associated with the pilot beam.

SUMMARY OF THE INVENTION

The present invention overcomes the deficiencies of prior free-space optical cross-connect switches by adjusting the launch trajectory of an information-bearing collimated laser beam in response to the position of a monitor component beam derived from a launched information bearing beam. Two component beams are obtained from the information-bearing beam: a payload component beam and a monitor component beam. Each component beam is derived in a manner which insures that its trajectory is directly related to the trajectory of the launched information-bearing beam. The payload component of the beam is directed onto a photo-receptor, and the monitor component is directed toward a photo-sensor. The launch trajectory of the information-bearing beam is adjusted in response to feedback received from the photo-sensor; this feedback being indicative of the monitor component beam position.

As the trajectories of both component beams are directly related to that of the launched information-bearing beam, the position of the monitor component beam is directly related to that of the payload component beam. More specifically, target regions are designated upon the photo-sensor so that when the monitor component beam is positioned upon a given target region, the associated payload component beam is positioned upon a corresponding photo-receptor. In accordance with the invention, a controller receives positional information from the photo-sensor and, responsively, adjusts the launch trajectory of the information-bearing beam so as to cause the monitor component beam derived from the launched beam to be incident upon a specific target region. Thus the associated payload component is made incident upon a corresponding photo-receptor.

In a particular embodiment of the invention, the monitor component beam is proportional to the payload component beam in both intensity and cross-sectional profile. This allows the photo-sensor to collect information indicative of payload component beam quality, thus providing a continuous and operationally transparent method of monitoring critical payload component beam characteristics.

BRIEF DESCRIPTION OF THE DRAWING

In the drawing:

FIG. 4 shows, in simplified form, a free-space optical switching apparatus including a second embodiment of the invention.

DETAILED DESCRIPTION

Figure 1:
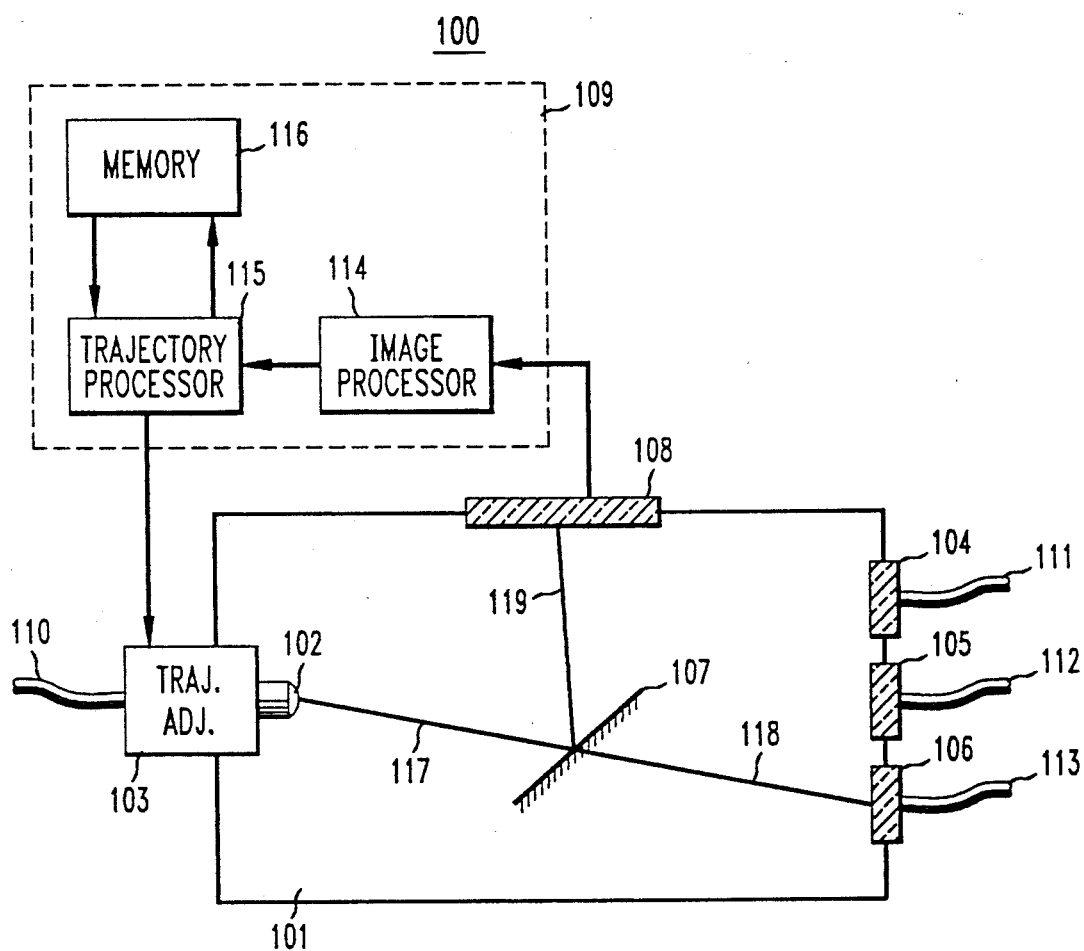
FIG. 1 shows, in simplified form, a free-space optical switching apparatus including an embodiment of the invention.

FIG. 1 shows, in simplified form, a preferred embodiment of the invention. Specifically, shown is optical switching apparatus 100, having free-space optical path 101. Collimated beam launcher 102 and beam trajectory adjusting means 103 are located at one end of free-space optical path 101. Photo-receptors 104, 105 and 106 are located at the opposite end of free-space optical path 101. Also shown, are partially-silvered mirror 107, CCD area sensor 108, processor/controller 109, and optical fibers 110, 111, 112, and 113. As illustrated in FIG. 1, processor/controller 109 is comprised of image processor 114, trajectory processor 115, and memory 116.

In this particular embodiment, optical fiber 110 delivers collimated laser beam 117 to beam launcher 102, which launches the beam into free-space optical path 101 toward photo-receptors 104, 105 and 106. The position of beam trajectory adjusting means 103 determines the particular trajectory the beam will have as it enters free-space optical path 101. Methods of adjusting the trajectory of a laser beam as it exits an optical fiber are well known in the art; they include servocontrolled motor and piezo-electric driven positioning means. The particular trajectory adjusting method employed is not critical, so long as rapid and accurate adjustments may be made in response to a control signal received from processor/controller 109.

Partially-silvered mirror 107 is positioned within free-space optical path 101 so that it lies in the path of collimated laser beam 117. A portion of laser beam 117 passes unobstructed through mirror 107, exiting as payload beam component 118. Another portion of beam 117 is reflected off of mirror 107 as monitor beam component 119. CCD area sensor 108 is positioned so that monitor beam component 119 will be incident upon its surface. The trajectory of payload beam component 118 and monitor beam component 119 are both functions of the trajectory of collimated laser beam 117. As a result, the location at which monitor beam component 119 strikes the surface of CCD area sensor 108 is directly related to the location at which payload beam component 118 is incident upon the end of free-space optical path 101 housing photo-receptors 104, 105 and 106. The sensitivity of CCD sensor 108 facilitates the accurate detection of monitor beams having relatively low intensities. This allows partially silvered mirror 107 to be configured so that close to 100% of collimated laser beam 117 exits unobstructed as payload beam 118, thereby minimizing optical losses within switching apparatus 100.

Figure 2:
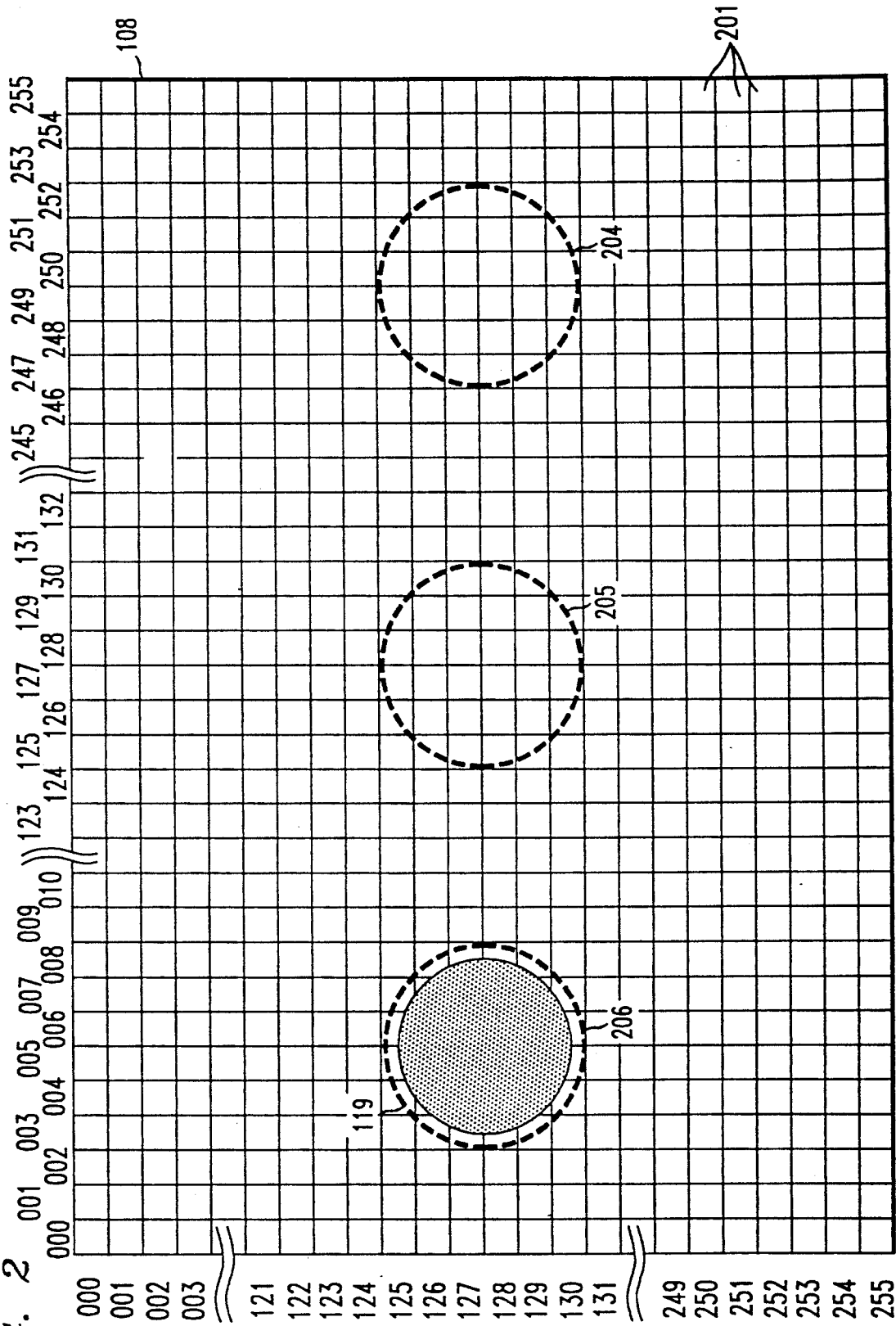
FIG. 2 shows a frontal view of the charge-coupled device ("CCD") area sensor of FIG. 1.

Specific sections of CCD area sensor 108 are designated as target regions. These target regions are chosen so that when payload beam component 118 is incident upon a particular photo-receptor, monitor beam component 119 will be incident upon an corresponding target region. FIG. 2 provides a detailed illustration of the surface of CCD area sensor 108. Typically, such CCD area sensors are comprised of a matrix of discrete photo-sensitive elements 201. Area sensor 108 is shown to be a 256×256 matrix of elements; each element being represented as a rectangular region upon the surface of the sensor. Individual photo-sensitive elements are identified by an address consisting of a column and row number (for purposes of illustration, the column and row numbers are shown in FIG. 2). The target regions associated with photo-receptors 104, 105 and 106 (FIG. 1) are indicated by the dotted-line circles 204, 205 and 206, respectively. These target regions are configured so they are slightly larger than the area upon CCD sensor 108 illuminated by a given monitor beam component (the profile of incident monitor beam component 119 is shown a shaded circular area in FIG. 2). The addresses of the elements within each of these target regions are stored in memory 116.

In operation, processor/controller 109 adjusts the trajectory of beam 117 so that payload beam component 118 is directed onto a particlar photo-receptor, thereby channeling the beam into an optical fiber and effecting an optical cross-connect. Typically, processor/controller 109 would receive the request to execute a particular cross-connect from a network manager or other processor which controls signal routing. To effect the cross-connect, image processor 114 scans CCD area sensor 108 and determines addresses of the elements which monitor beam component 119 (represented by the shaded circular area within target region 206) is incident upon. These addresses are passed to trajectory processor 115, which compares them to the element addresses for the target region corresponding to the particular photo-receptor to which payload beam component 118 is to be directed. Trajectory processor 115 then transmits a control signal to beam trajectory adjusting means 103 so as to alter the launch trajectory of collimated laser beam 117 and, thereby cause monitor beam component 119 to be incident upon the elements associated with the desired target location. Feedback on the position of monitor beam component 119 is received by trajectory processor 115 in the form of the addresses of the elements upon which monitor beam component 119 is incident. This feedback enables trajectory processor 115 to monitor and correct any errors in the positioning of beam 117 and, hence, payload beam component 118.

Figure 3:
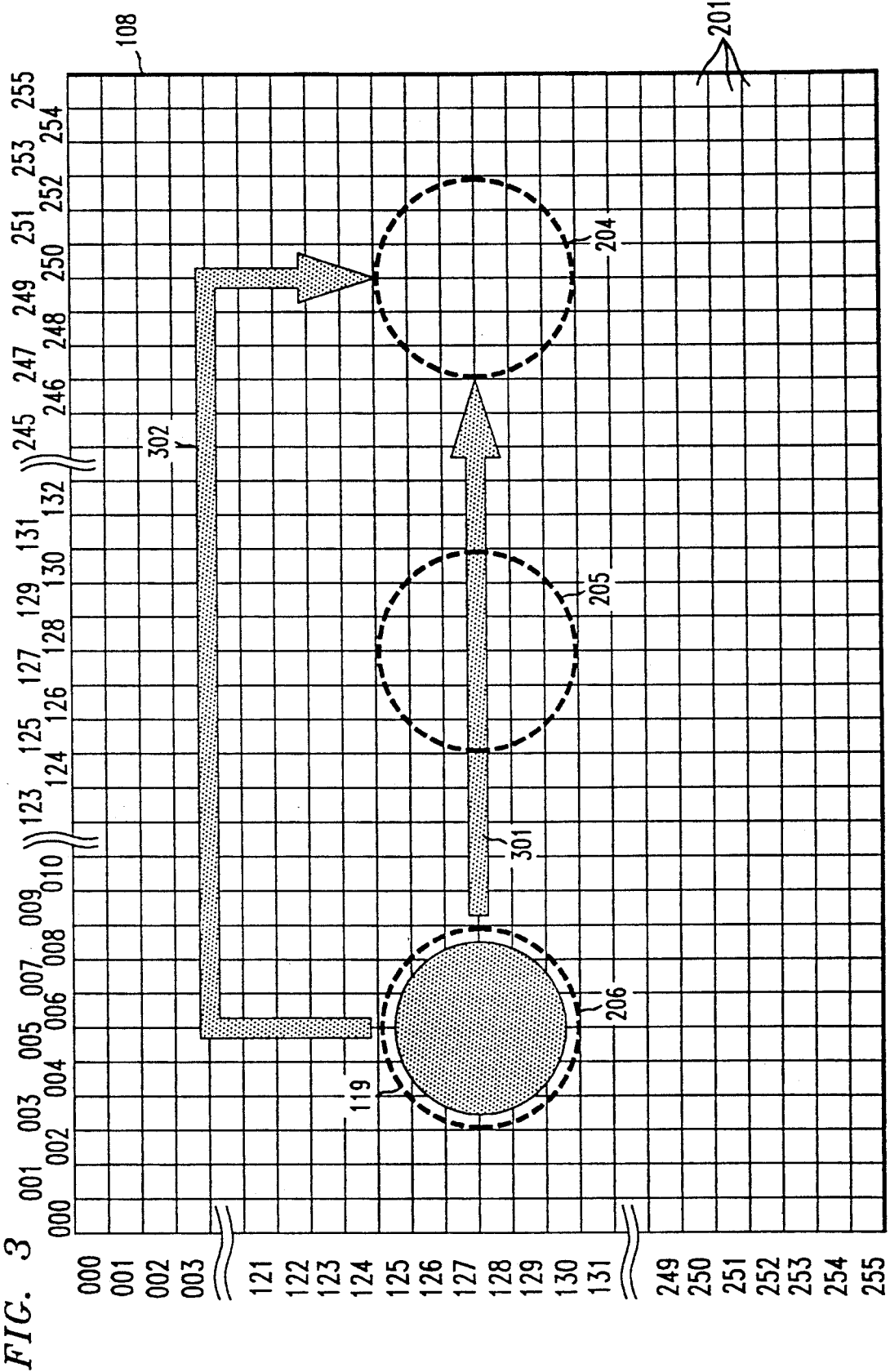
FIG. 3 shows the path of a collimated beam across the surface of the CCD area sensor of FIG. 1.

In the process of causing monitor beam component 119 to coincide with a desired target region, an unintentional optical connection may result. For example, as shown in FIG. 3, translating monitor beam component 119 from target region 206 to target region 204, via the shortest path (shown as shaded arrow 301), would result in the monitor beam component passing directly across target region 205. This would cause payload beam component 118 to pass over photo-receptor 105, and an unintentional cross-connect to be temporarily established as the beam was channeled into optical fiber 112. To insure that such unintentional channeling does not take place, trajectory processor 115 is programmed to direct the monitor beam component around elements associated with non-destination target regions (see shaded arrow 302).

Several advantages are offered by the use of a CCD area sensor in this particular embodiment of the invention; one of which is the elimination of "blind spots". As almost the entire surface of CCD 108 is photo-sensitive, image processor 114 is provided with information as to the position of the monitor beam component 119 anywhere on the CCD's surface—not just over or near specific target regions. This reduces the likelihood of the processor/controller 109 being left "blind" as to the location of the monitor beam component.

In addition, the resolution and light sensitivity of CCD area sensor 108 enables processor/controller 109 to monitor payload beam component quality as a function of monitor beam component quality. CCD sensor 108 is configured so that the cross-sectional profile of monitor beam component 119 traverses a plurality of individual elements. Image processor 114 collects information indicative of the average intensity of monitor beam component 119 incident upon the elements of CCD area sensor 108. This intensity information, which provides an accurate indication of the effective power and cross-sectional profile of monitor beam component 119, is passed from image processor 114 to trajectory processor 115. Trajectory processor 115 compares the received information with profile and intensity standards stored in memory 116, thus allowing the detection of undesirable fluctuations in beam quality. As both monitor beam component 119 and payload beam component 118 originate from the same collimated laser beam 117, the quality of the monitor beam component provides an accurate measure of payload beam component quality.

Another embodiment of the invention is shown in FIG. 4. Specifically, shown is optical switching apparatus 400, having free-space optical path 101. Collimated beam launcher 102 and beam trajectory adjusting means 103 are located at one end of free-space optical path 101; photo-receptors 404, 405 and 406 located at an opposite end. Also shown are partially-silvered mirror 107, CCD area sensor 108, processor/controller 109, and transmission means 410, 411, 412, and 413. As illustrated in FIG. 4, processor/controller 109 is comprised of image processor 114, trajectory processor 115, and memory 116.

Operation and control of this second embodiment is similar to the previously described embodiment. However, in this particular embodiment an electrical signal, as opposed to an optical signal, is delivered to optical switching apparatus 400. This electrical signal is delivered via transmission means 410, to laser 402. Laser 402 produces a collimated beam 117 in response to the delivered electrical signal, and launches that beam into free-space optical path 101 toward photo-receptors 404, 405 and 406. Unlike the previously described embodiment, photo-receptors 404, 405, and 406 do not channel incident payload component beams into optical fibers. Rather, each of the photo-receptors 404, 405 and 406 generates an electrical signal in response to incident laser beams. These electrical signals are carried out of the optical switching apparatus 400 via electrical transmission means 411, 412, and 413.

It will be understood that the particular embodiments described above are only illustrative of the principles of the present invention, and that various modifications could be made by those skilled in the art without departing from the scope and spirit of the present invention, which is limited only by the claims that follow. One such modification might include an optical switching apparatus having a plurality of independently controllable collimated laser beam launchers, each being responsive to a control signal from a processor/controller.

I claim:

1. An optical switching apparatus comprising:
    means responsive to a control signal for controllably launching a collimated laser beam along a selectable trajectory into a free-space optical path;
    means for obtaining first and second component beams from said launched collimated laser beam, each of said component beams having a trajectory directly related to said trajectory of said launched collimated laser beam;
    a plurality of optical receptors for collecting said first component beam from said free-space optical path; and
    control means responsive to a trajectory of said second component beam for generating said control signal, wherein said control signal is applied to means for controllably launching said collimated laser beam so as to direct said first component beam onto a selected one of said plurality of optical receptors.

2. The optical switching apparatus of claim 1 wherein said control means includes a photo-sensitive device for sensing said trajectory of said second component beam.

3. The optical switching apparatus of claim 1 wherein said means for controllably launching a collimated laser beam includes an optical fiber.

4. The optical switching apparatus of claim 1 wherein said means for controllably launching a collimated laser beam includes a laser.

5. The optical switching apparatus of claim 1 wherein said means for obtaining first and second component beams from said launched collimated laser beam is a partially-reflective mirror.

6. The optical switching apparatus of claim 1 wherein each of said optical receptors is adapted to channel said first component beam into an optical fiber.

7. The optical switching apparatus of claim 1 wherein each of said optical receptors is adapted to produce an electrical signal in response to the collected optical beam.

8. The optical switching apparatus of claim 2 wherein said photo-sensitive device is a charged-coupled device.

9. The optical switching apparatus of claim 2 wherein said photo-sensitive device generates a signal indicative of the intensity of said second component beam.

10. The optical switching apparatus of claim 2 wherein said photo-sensitive device generates a signal indicative of the cross-sectional profile of said second component beam.

11. The optical switching apparatus of claim 2 wherein said control means further includes means being responsive to said sensed trajectory of said second component beam, and said means for controllably launching said collimated laser beam further includes means responsive to said generated control signal to redirect the launch trajectory of said collimated laser beam so as to cause said second component beam to be incident upon a target region of said photo-sensitive device, said target region being located so that when said second component beam is incident upon said target region, said first component beam is directed onto a corresponding one of said plurality of optical receptors.

12. An optical switching apparatus comprising:
    means responsive to a control signal for controllably launching a collimated laser beam along a selectable trajectory into a free-space optical path;
    a mirror having a partially-reflective surface, said mirror being positioned within said free-space optical path so that said launched collimated laser beam is incident upon said partially-reflective surface, and oriented so as to allow a first component of said launched laser beam to pass through said partially-reflective surface, while causing a second component of said launched laser beam to be reflected off of said partially-reflective surface;
    a plurality of optical receptors adapted for collecting said first component beam from said free-space optical path;
    a photo-sensitive charge-coupled device for sensing the trajectory of said second component beam; and
    control means for generating said control signal in response to the trajectory of said second component beam as sensed by said photo-sensitive charge-coupled device, wherein said control signal is applied to said means for controllably launching said collimated laser beam so as to direct said first component beam onto a selected one of said plurality of optical receptors.

13. The optical switching apparatus of claim 12 wherein said means for controllably launching said collimated laser beam includes means for responsive to said generated control signal for redirecting the launch trajectory of said collimated laser beam so as to cause said second component beam to be incident upon a target region of said photo-sensitive charge-coupled device, said target region being located so that when said second component beam is incident upon said target region, said first component beam is directed onto a corresponding one of said plurality of optical receptors.

14. The optical switching apparatus of claim 12 wherein said means for controllably launching a collimated laser beam further includes an optical fiber.

15. The optical switching apparatus of claim 12 wherein said means for controllably launching a collimated laser beam further includes a laser.

16. The optical switching apparatus of claim 12 wherein each of said optical receptors is adapted to channel said first component beam into an optical fiber.

17. The optical switching apparatus of claim 12 wherein each of said optical receptors is adapted to produce an electrical signal in response to the collected optical beam.

18. The optical switching apparatus of claim 12 wherein said photo-sensitive means generates a signal indicative of the intensity of said second component beam.

19. The optical switching apparatus of claim 12 wherein said photo-sensitive means generates a signal indicative of the cross-sectional profile of said second component beam.

20. An optical switching apparatus comprising:
means responsive to a control signal for controllably launching a collimated laser beam along a selectable trajectory into a free-space optical path;
a mirror having a partially-reflective surface, said mirror being positioned within said free-space optical path so that said launched collimated laser beam is incident upon said partially-reflective surface, and oriented so as to allow a first component of said launched laser beam to pass through said partially-reflective surface, while causing a second component of said launched laser beam to be reflected off of said partially-reflective surface;
a plurality of optical receptors adapted for collecting said first component beam from said free-space optical path;
a photo-sensitive charge-coupled device for sensing the trajectory of said second component beam, said charge-coupled device being adapted to generate a signal indicative of the intensity and cross-sectional profile of said second component beam; and
control means for generating said control signal in response to the sensed trajectory of said second component beam as sensed by said photo-sensitive means, wherein said control signal is applied to said means for controllably launching said collimated laser beam so as to direct said first component beam onto a selected one of said plurality of receptors.

21. The optical switching apparatus of claim 20 wherein said means for controllably launching includes means responsive to said generated control signal for redirecting the launch trajectory of said collimated laser beam so as to cause said second component beam to be incident upon a target region of said photo-sensitive charge-coupled device, said target region being located so that when said second component beam is incident upon said target region, said first component beam is directed onto a corresponding one of said plurality of optical receptors.

* * * * *